(12) United States Patent
Kenzie

(10) Patent No.: X9836
(45) Date of Patent: Jul. 1, 1836

(54) WATER WHEEL

(76) Inventor: Charles Kenzie

Charles Menzie
Letters Patent

The schedule referred to in these Letters Patent and making part
of the same containing a description in the words of the said C —
Menzie himself of his "Improvement in the mode of applying
water to central discharging Percussion water wheels"

---

To all to whom these presents shall come. Be it known that I
Charles Menzie of the City of Troy in the County of Rensselaer and
State of New York have invented a new and useful improvement
in the mode of applying water to central discharging percussion water
wheels and that the following is a full and exact description of the
construction and operation of the said improvement as invent
ed by me. Although there are several ways in which the princi
ple of my improvement may be applied I shall describe that
which I deem best. I construct a cast iron or wooden horizon -
tal trunk with strength proportioned to the head of water for which
it is intended, the depth of said trunk inside, the same as the
length of the water wheel bucket (or float). Width in the clear
double the diameter of the wheel and all proportioned to the supply
of water or the quantity of power required. Said trunk may (if re
quired) be left open at both ends and provided with flanches or
some other convenient fixtures to secure it by means of screw bolts (or
otherwise) to the Flume (or flume) through which the water is received.
A circular opening is formed in the top and bottom of said trunk
for the admission of the wheel which is of ordinary construction either
of wood or iron consisting of two rims with rectangular floats
between said rims and arms extended from the shaft to the centre
of the float close to the edge of said openings in the trunk both at
top and bottom. Holes are made of suitable size in the castings or
planks at equal distances apart for the purpose of receiving the
pivots of the gates hereinafter mentioned. Also the same number
B of equidistant holes are made outside of these at the top opposite the
outer end of the gates which are to receive the pivots of the levers by
which the gates are opened or closed. The gates may be six, eight, or
ten in number according to the size of the wheel and are segments
of a circle of about the same radius as the periphery of the wheel
and may be constructed of wood, cast or wrought iron of a breadth
equal to the depth of the trunk having pivots at the inner ends
sufficiently strong to resist the pressure of water which are inserted
in the holes next the circular openings in the trunk above mention-
ed and acting as hinges. The outer end of each gate when closed ex-
tends a short distance past the inner end of the succeeding one and
when open they form a series spiral passages or inlets to the wheel
through which the water acts at an angle of about forty five de-
grees on the bucket or float of the water wheel and afterwards dis-
charges towards the centre both above and below the arms of the
wheel. To open and shut these gates a series of angular pointed
levers each consisting of a short arm attached to a [illegible] with a
strong pivot that passes through the outer series of holes above men-
tioned in the top of the trunk and receives a screw nut on the up-
per side of the trunk to secure it to its place and also another short
arm to be connected at its extremity and in the upper corner of the
outer end of the gates by links constituting an angular pointed lev-
er the operation of which is to close or open the gates by simply turn-
ing the pivots and these pivots being connected to a suitable ring
or wheel or other suitable machinery a simultaneous closing or
opening of all the gates to any desired degree is effected by simply
moving said wheel by which means the quantity of water applied
to the wheel admits of exact regulation and its maximum effect
therefore secured in any stage of water as the head may always be
kept full. Now what I claim as my own invention and not
previously known is the above described water wheel and its appur-
tenances, are the moveable gates or water guides and their use
in connection with or in application to all central discharg-
ing ingravation shall. In testimony that the foregoing is a true specification of my said Instrument I have hereunto set my hand this eleventh day of June A.D. 1836.

Witnesses
Geo. Gerke
Henry Hiaasz

C. Hanger

Ed
H.K.